United States Patent
Fletcher et al.

(10) Patent No.: US 9,863,537 B2
(45) Date of Patent: Jan. 9, 2018

(54) CHECK VALVE WITH IMPROVED SEALING MEMBER

(71) Applicants: David E. Fletcher, Flint, MI (US); Brian M. Graichen, Leonard, MI (US); Keith Hampton, Ann Arbor, MI (US); Matthew C. Gilmer, Whitmore Lake, MI (US); Andrew D. Niedert, Farmington Hills, MI (US)

(72) Inventors: David E. Fletcher, Flint, MI (US); Brian M. Graichen, Leonard, MI (US); Keith Hampton, Ann Arbor, MI (US); Matthew C. Gilmer, Whitmore Lake, MI (US); Andrew D. Niedert, Farmington Hills, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 91 days.

(21) Appl. No.: 14/934,650

(22) Filed: Nov. 6, 2015

(65) Prior Publication Data
US 2016/0195189 A1    Jul. 7, 2016

Related U.S. Application Data

(60) Provisional application No. 62/076,526, filed on Nov. 7, 2014.

(51) Int. Cl.
*F16K 15/08*    (2006.01)
*F16J 15/16*    (2006.01)
(Continued)

(52) U.S. Cl.
CPC ............. *F16J 15/164* (2013.01); *F16K 15/02* (2013.01); *F16K 15/023* (2013.01); *F16K 15/141* (2013.01)

(58) Field of Classification Search
CPC ...... F16K 15/164; F16K 15/02; F16K 15/023; F16K 15/141; F16K 15/028
(Continued)

(56) References Cited

U.S. PATENT DOCUMENTS

| 963,463 A | * | 7/1910 | Mueller | ................. F02M 21/02 |
| | | | | 123/527 |
| 2,800,142 A | | 7/1957 | Champion | |

(Continued)

FOREIGN PATENT DOCUMENTS

JP    H-08277947    10/1996

OTHER PUBLICATIONS

PCT, International Search Report and Written Opinion, Patent Application No. PCT/US2015/059453 (dated Jan. 14, 2016).

*Primary Examiner* — Kevin Lee
*Assistant Examiner* — P. Macade Nichols
(74) *Attorney, Agent, or Firm* — FisherBroyles, LLP; Susan M. Oiler (57) ABSTRACT

Check valves are disclosed that have a housing defining an internal cavity having a first port and a second port both in fluid communication therewith, and having a first seat defined by a first elastomeric V-ring seal and a second seat, and a check valve plate within the internal cavity that is translatable, in response to pressure differentials, between a closed position against the first seat and an open position against the second seat within the internal cavity of the housing. The first elastomeric V-ring seal includes a body having an interference fit to an annular channel defined by the housing and a lip extending from the body in a direction that defines a generally V-shaped void, viewed in cross-section, opening in a direction away from and generally perpendicular to the flow through the elastomeric V-ring seal into the internal cavity.

11 Claims, 5 Drawing Sheets

(51) Int. Cl.
*F16K 15/02* (2006.01)
*F16K 15/14* (2006.01)

(58) Field of Classification Search
USPC .......... 137/516.25, 516.29, 533.19, 533.27, 137/533.29, 543.21; 251/359, 368; 277/530
See application file for complete search history.

(56) References Cited

U.S. PATENT DOCUMENTS

| | | | | |
|---|---|---|---|---|
| 3,091,254 A | * | 5/1963 | Kilayko | ................. F16K 15/04 137/516.29 |
| 4,373,550 A | * | 2/1983 | Yelich | .................... F16K 15/00 137/516.27 |
| 4,556,086 A | | 12/1985 | Raines | |
| 4,986,310 A | | 1/1991 | Bailey et al. | |
| 5,992,462 A | * | 11/1999 | Atkinson | .............. A61M 39/24 137/515.5 |
| 8,327,870 B2 | * | 12/2012 | Sidler | .................. F16K 3/0227 137/242 |

* cited by examiner

CHECK VALVE WITH IMPROVED SEALING MEMBER

TECHNICAL FIELD

This application relates to check valves for use in engine systems such as internal combustion engines, more particularly to check valves having an improved sealing member.

BACKGROUND

Engines, for example vehicle engines, have included aspirators and/or check valves for a long time. Typically, the aspirators are used to generate a vacuum that is lower than engine manifold vacuum by inducing some of the engine air to travel through a venturi. The aspirators may include check valves therein or the system may include separate check valves. When the check valves are separate they are typically included downstream between the source of vacuum and the device using the vacuum.

In engines that include a brake boost system, conditions exist that may make it difficult for a check valve to seal effectively. In particular the sealing in a check valve may be less than desired at low temperatures and/or low sealing pressure differentials. Moreover, the engine system may require, or the manufacturer may specify, a weight limit for a check valve. One way to address the weight is to reduce the weight of the movable sealing member within the check valve. Reducing the weight however can exacerbate the problem of sealing in particular its ability to withstand large sealing pressure differentials.

Currently available check valves have a check valve assembly with a check valve disk made from a compliant material in order for the disk to conform to the manufacturing variations of a sealing surface. Good sealing is required even at low pressure difference across the disk. When the pressure difference becomes large sealing is assured, so long as the disk does not deform sufficiently so as to lift off the sealing surface. In addition, large stresses can be induced inside a compliant disk due to the resulting forces in a high pressure difference.

A rigid disk material will not effectively seal when lightly loaded; however, it will withstand the high load better than a non-rigid disk. This is a need to provide more efficient sealing under each condition at some time during operation of the system.

SUMMARY

In one aspect, check valves are disclosed that have a housing defining an internal cavity having a first port and a second port both in fluid communication therewith, and having a first seat defined by a first elastomeric V-ring seal and a second seat, and a check valve plate within the internal cavity that is translatable, in response to pressure differentials, between a closed position against the first seat and an open position against the second seat within the internal cavity of the housing. The first elastomeric V-ring seal includes a body having an interference fit to an annular channel defined by the housing and a lip extending from the body in a direction that defines a generally V-shaped void, viewed in cross-section, opening in a direction away from and generally perpendicular to the flow through the elastomeric V-ring seal into the internal cavity.

The first elastomeric V-ring seal is positioned in the housing to mate with a major surface of the check valve plate proximate an outer periphery of the major surface, and may be positioned to surround an opening defined by the housing for fluid communication between the internal cavity and the first port. When there is only one elastomeric V-ring seal present in the check valve (the first elastomeric V-ring seal), the check valve plate is a continuous plate. There may also be a second elastomeric V-ring seal present, which is disposed radially inward of the first elastomeric V-ring seal. In all embodiments of the check valves, the second seat is a plurality of radially spaced apart fingers extending into the internal cavity.

The housing in any of the embodiments may comprise one or more alignment members extending into the internal cavity positioned to guide the check valve plate as it translates between the closed and open positions. With one or more alignment members present, the one or one of the alignment members may be a generally central alignment member. Here, the check valve plate has a bore therethrough and the generally central alignment member is received in the bore. The second elastomeric V-ring seal is present here and is disposed about and proximate the generally central alignment member with an opening of a generally V-shaped void formed by a body and a lip of the second elastomeric V-ring seal facing toward the generally central alignment member.

In an optional aspect of the check valves, a plurality of alignment members are positioned within the internal cavity. In one embodiment, the check valve plate has a cogged periphery, and each cog is between consecutive alignment members of the plurality of alignment members. In another embodiment, the plurality of alignment members protrude inward from an interior wall of the internal cavity, and the check valve plate has a uniform outer diameter.

DETAILED DESCRIPTION

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

Figure 1:
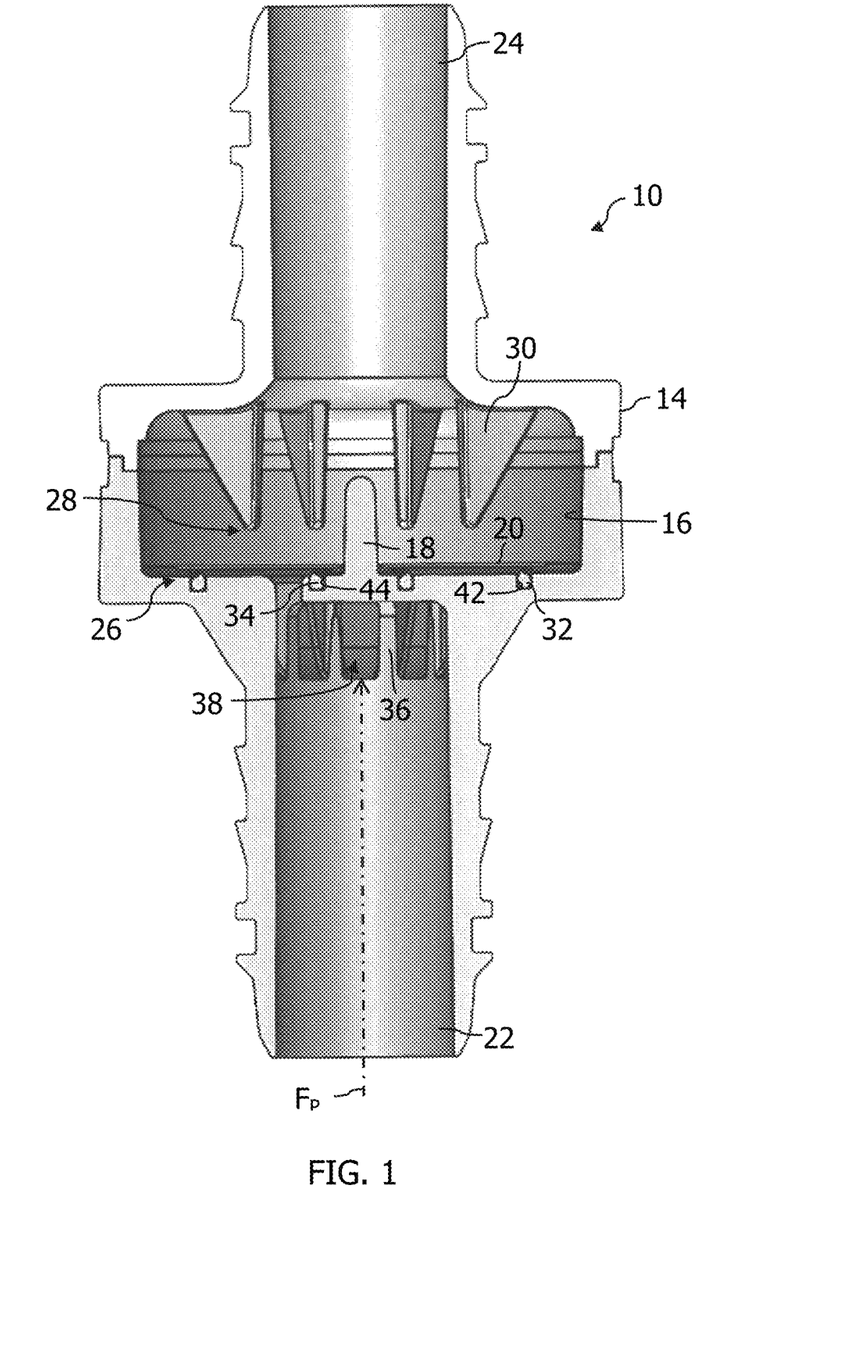
FIG. 1 is a longitudinal, cross-sectional view of one embodiment of a check valve.
Figure 2:
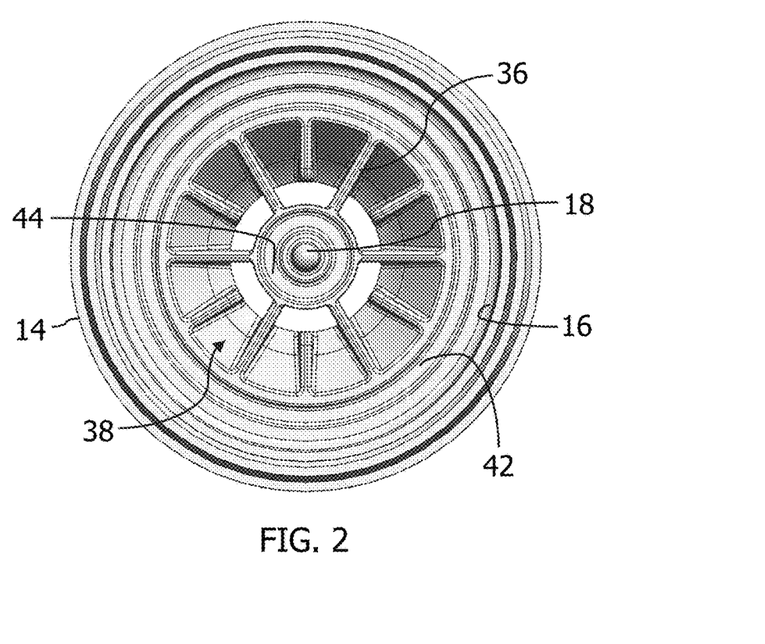
FIG. 2 is a top plan view into the internal cavity of the check valve of FIG. 1.
Figure 3:
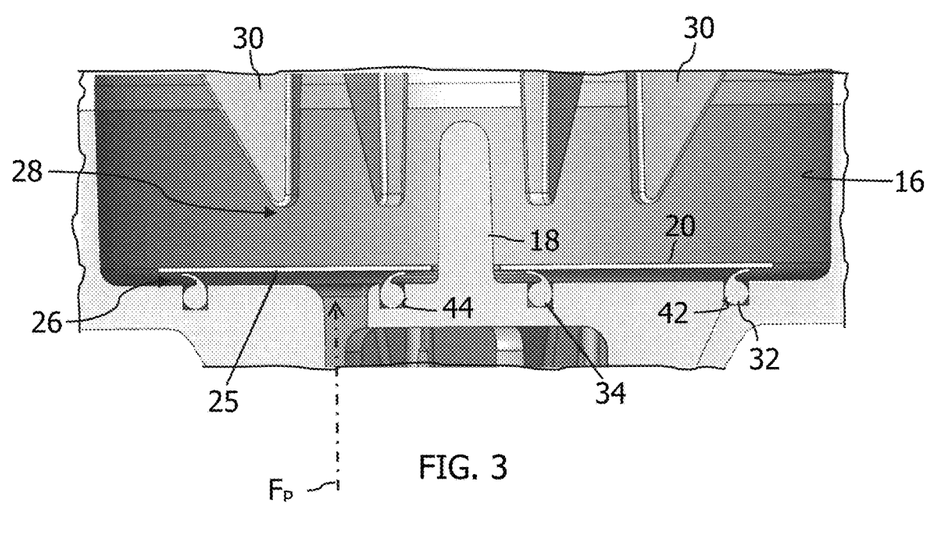
FIG. 3 is an enlarged, c longitudinal cross-sectional view of the internal chamber of the check valve of FIG. 1.

FIGS. 1-3 disclose a check valve 10 that includes a housing 14 defining an internal cavity 16 having a pin 18 therein upon which is seated a check valve plate 20 and defining a first port 22 in fluid communication with the internal cavity 16 and a second fluid port 24 in fluid communication with the internal cavity 16. The housing 14 may be a multiple piece housing with pieces connected together with a fluid-tight seal. The internal cavity 16 typically has larger dimensions than the first port 22 and the second port 24, in particular a larger width when viewed as a longitudinal cross-section or larger diameter. In the illustrated embodiment, the first port 22 and the second port 24 are positioned opposite one another to define a generally linear flow path ($F_P$) through the check valve 10, when the check valve plate 20 is not present, but is not limited to this configuration. In another embodiment, the first and second fluid ports 22, 24 may be positioned relative to one another at an angle of less than 180 degrees.

Figure 7:
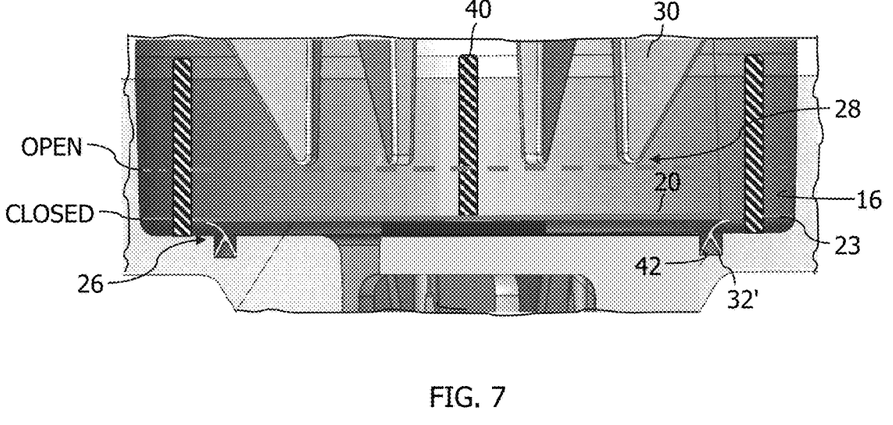
FIG. 7 is an enlarged, longitudinal cross-sectional view of another embodiment for the internal chamber of a check valve.

The portion of the housing 14 defining the internal cavity 16 includes an internal first seat 26 upon which the check valve plate 20 seats when the check valve is "closed" and a second seat 28 upon which the sealing member seats when the check valve is "open." In FIGS. 3 and 7, the first seat 26 is defined by at least a first elastomeric V-ring seal 32 and may also include a second elastomeric V-ring seal 34 as illustrated in FIGS. 1 and 3. The first elastomeric V-ring seal 32 and the second elastomeric V-ring seal 34 may both have a portion thereof (body portion 52, 52' (FIG. 4)) having an interference fit with a respective first annular channel 42 and second annular channel 44 defined by the housing 14. The first elastomeric V-ring seal 32 and/or the second elastomeric V-ring seal 34 is positioned in the housing 14 to mate with a major surface 25 of the check valve plate 20 proximate an outer periphery of the major surface, such as a lip portion 53, 53' (FIG. 4) that is directed generally radially outward away from the first port. Additionally, the first elastomeric V-ring seal 32 is positioned to surround the conduits 38 defined by the housing for fluid communication between the internal cavity 16 and the first port 22. The second seat 28 is defined by a plurality of radially spaced fingers 30 extending into the internal cavity 16 from an interior surface of the internal cavity 16 that is more proximate the second port 24.

Referring again to FIGS. 3 and 7, the housing 14 has one or more alignment members 40 extending into the internal cavity 16 positioned to guide the check valve plate 20 as it translates between the closed position and open position. In the embodiment illustrated in FIG. 2, the housing 14 has one alignment member, the generally centrally-positioned alignment member 18, and the check valve plate 20 has a bore 21 therethrough with the alignment member 18 received therein. A plurality of arms 36 extend radially outward from the pin 18 to subdivide the flow path ($F_P$) leading into the internal cavity 16 into a plurality of conduits 38 to direct the fluid flow around the periphery of the check valve plate 20 when the check valve plate 20 is in the open position, and between bore 21 of the check valve plate 20 and alignment member 18. This embodiment includes a second elastomeric V-ring seal 34 disposed about and proximate the central alignment member 18 with the lip portion 53' directed generally radially inward toward the alignment member 18.

In the embodiment of FIG. 7, the housing 14 has a plurality of alignment members 40 positioned about an outer periphery 23 of the check valve plate 20. Here, the check valve plate 20 has cogged outer periphery. Each cog is positioned between consecutive alignment members of the plurality of alignment members to maintain the check valve plate 20 in alignment as it translates between the open and closed positions. Alternately, the alignment members 40 may be aligned with either the arms 36 or the fingers 30, or both.

Figure 4:
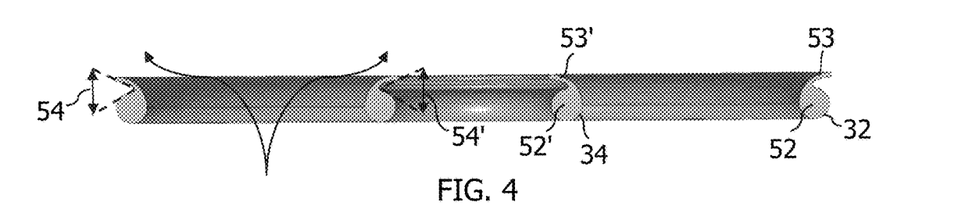
FIG. 4 is an enlarged, longitudinal cross-sectional view of the first and second elastomeric V-ring seals of the check valve of FIG. 1.
Figure 5:
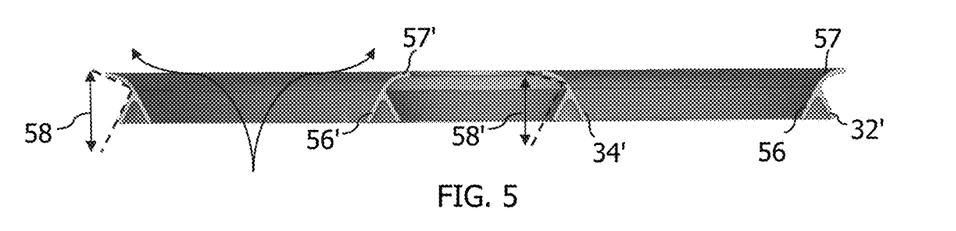
FIG. 5 is an enlarged, longitudinal cross-sectional view of a second embodiment of first and second elastomeric V-ring seals.
Figure 6:
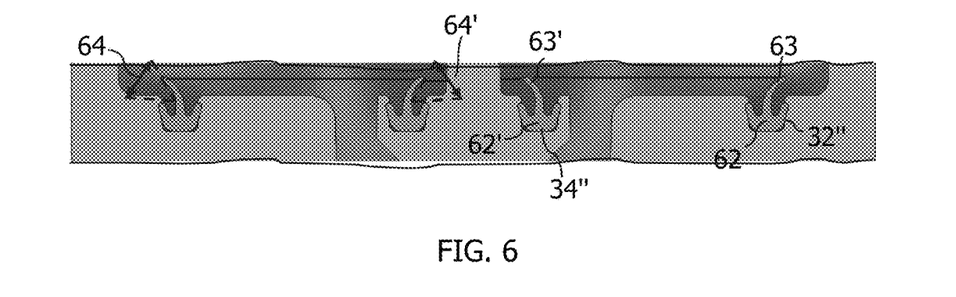
FIG. 6 is an enlarged, longitudinal cross-sectional view of a third embodiment of first and second elastomeric V-ring seals.

Turning now to FIGS. 4-6, the first elastomeric V-ring seal 32, 32', 32" each have a body 52, 56, 62 having an interference fit to an annular channel 42 defined by the housing 14 and a lip 53, 57, 63 extending from the body in a direction that defines a generally V-shaped void 54, 58, 64 viewed in a longitudinal cross-section, opening in a direction away from and generally perpendicular to the flow through the elastomeric V-ring seal 32, 32', 32" into the internal cavity 16 and in a direction to divert the flow radially inward and/or outward around the check valve plate 20. In FIGS. 1 and 3-7, the opening of the generally V-shaped void 54, 58, 64 faces generally radially outward. The second elastomeric V-ring seals 34, 34', 34" each have a body 52', 56', 62' having an interference fit to an annular channel 44 defined by the housing 14 and a lip 53', 57', 63' extending from the body in a direction that defines a generally V-shaped void 54', 58', 64' viewed in a longitudinal cross-section, opening in a direction away from and generally perpendicular to the flow through the elastomeric V-ring seal 34, 34', 34" into the internal cavity 16 and in a direction to divert the flow radially inward and/or outward around the check valve plate 20. In FIGS. 1 and 3-6, the opening of the generally V-shaped void 54', 58', 64' faces generally radially inward.

FIGS. 4-6 demonstrate that the body portion 52, 56, 62 and 52', 56', 62' of the first and second elastomeric V-ring seals 32, 32', 32" and 34, 34', 34" may have various shapes, as viewed in a longitudinal cross-section. In the embodiment of FIG. 4, the bodies 52, 52' are generally circular in a longitudinal cross-section, and, when considering the lips 53, 53', the V-ring seals 32, 34 are overall generally comma-shaped. Whereas, the bodies 56, 56' of FIG. 5 are generally V-shaped, and, when considering the lips 57, 57', the V-ring seals 32', 34' are overall generally Y-shaped. The V-ring seals 32", 34" of FIG. 6 are overall generally T-shaped. There is no general limit to the cross-sectional shape of the body of a V-ring seal, but it typically is a shape that will form an interference fit within the annular channel 42 of the housing 14 and when fit within the annular channel 42 applies minimal stress to a lip extending out of the annual channel to engage the check valve plate.

Turning now to the second elastomeric V-ring seal 34, 34', 34", when present, is typically disposed radially inward of the first elastomeric V-ring seal 32, 32', 32" as shown in FIGS. 1, and 3-6. The second elastomeric V-ring seal is seated in an annular channel 44 with an interference fit as shown in FIGS. 1-3. Here, however, the opening of the generally V-shaped void 54', 58', 64' formed by the body 52', 56', 62' and the lip 53', 57', 63' faces generally toward the central alignment member 18.

Other elastomeric seals may also be used in the check valves disclosed herein, such as an O-ring seal and an X-ring seal. For these other elastomeric seals, they do need to extend beyond the annual channel in which the seal is seated to define a first seat for the check valve plate. Moreover, any of the elastomeric seals, V-ring or otherwise may be mixed and matched in a check valve, there is no requirement that the first and second elastomeric seals be of the same shape.

The first and second elastomeric V-ring seals may be made of or include a rubber that is suitable for the temperatures, temperature changes, and other conditions that the check valve will be exposed to within a system such as an internal combustion engine. Suitable rubbers include nitrile rubber and Vitron® fluoroelastomer. The lip 53 of the elastomeric V-ring seals is typically made of or includes a material that mates with imperfections in the check valve plate 20 when seated against the lip 53 to form a tight seal thereagainst.

The check valve plate is typically a rigid member made of or including a material of suitable rigidity. Suitable examples include, but are not limited to, a metal plate, plastics such as nylon or acetyl with or without fill (typically 30% by volume glass, minerals, and the like), or carbon fiber materials. As used herein "metal" is used generically to represent all materials that may be pure metal, metal alloys, metal composites, and combination thereof having a suitable rigidity.

Figure 8:
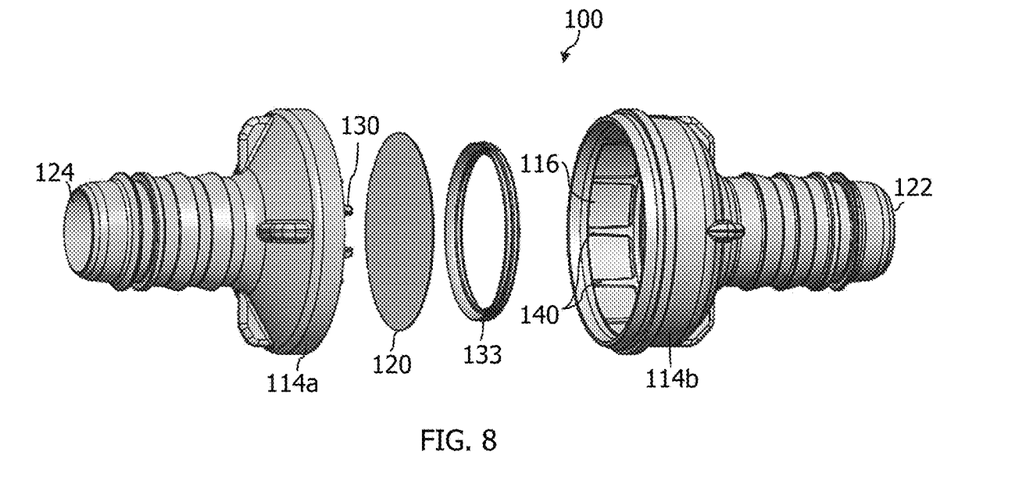
FIG. 8 is an exploded, front perspective view of a check valve having a continuous check valve plate and only a first elastomeric V-ring seal.
Figure 9:
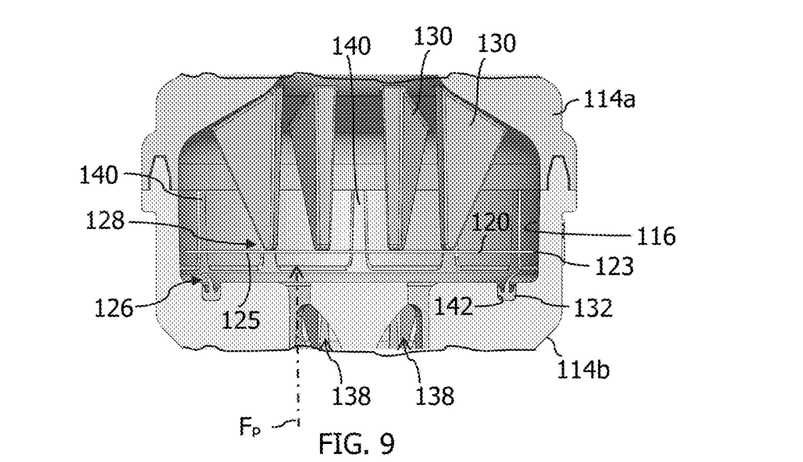
FIG. 9 is an enlarged, longitudinal cross-sectional view of the internal chamber of the check valve of FIG. 8.

Referring now to FIGS. 8-9, a check valve 100 is shown that includes a housing having an upper portion 114a and a lower portion 114b defining an internal cavity 116 and defining a first port 122 in fluid communication with the internal cavity 116 and a second fluid port 124 in fluid communication with the internal cavity 116. The housing 114 is shown as multiple piece housing with the upper portion 114a and the lower portion 114b connected together with a fluid-tight seal. The internal cavity 116 typically has larger dimensions than the first port 122 and the second port 124, in particular a larger width when viewed as a longitudinal cross-section or larger diameter. In the illustrated embodiment, the first port 122 and the second port 124 are positioned opposite one another to define a generally linear flow path ($F_P$) through the check valve 100, when the check valve plate 120 is not present, but is not limited to this configuration. In another embodiment, the first and second fluid ports 122, 124 may be positioned relative to one another at an angle of less than 180 degrees.

The internal cavity 116 includes an internal first seat 126 upon which the check valve plate 20 seats when the check valve is "closed" (shown in FIG. 7) and a second seat 128 upon which the sealing member seats when the check valve is "open" (FIG. 9). In FIG. 9, the first seat 126 is defined by only one elastomeric seal 132, which may be any of the elastomeric seals disclosed herein and any equivalent thereof. With only one elastomeric seal, the check valve plate is a continuous plate, typically of a rigid material. The elastomeric seal 132, in particular a portion protruding from the annular channel 142, such as a lip portion 63 in FIG. 6, and the check valve plate 120 mate together typically proximate an outer periphery 123 of a first major surface 125 of the check valve plate. The elastomeric seal 132 has a portion thereof (body portion 62 (FIG. 6)) having an interference fit with the annular channel 142. The lip portion 63 (FIG. 6) is directed generally radially outward away from the first port. The elastomeric seal 132 is positioned to surround the conduits 138 defined by the housing for fluid communication between the internal cavity 116 and the first port 122. The second seat 128 is defined by a plurality of radially spaced fingers 130 extending into the internal cavity 116 from an interior surface of the internal cavity 116 that is more proximate the second port 124.

Still referring to FIGS. 8-9, the housing 114 has one or more alignment members 140 extending into the internal cavity 116 positioned to guide and/or maintain alignment of the check valve plate 120 within the internal cavity as it translates between the closed position and open position. In this embodiment, the plurality of alignment members 140 protrude inward from an interior wall of the internal cavity, and the check valve plate has a uniform outer diameter. These alignment member 140 may be referred to as fluting.

The presence of the elastomeric V-ring seals as the first seat provide the advantages that the check valve plate may be light weight, resist or withstand high pressure differential while sealing effectively at low differential pressures, minimize the pressure drop of the check valve, and seal effectively. Additionally, this lighter weight check valve can operate to reduce the adverse effects of surge phenomena in a system, such as engine systems that include a turbocharge, without the need for an electrical interface.

What is claimed is:

1. A check valve comprising:
   a housing defining an internal cavity having a first port and a second port both in fluid communication therewith, and having a first seat defined by a first elastomeric V-ring seal and a second seat;
   a second elastomeric V-ring seal disposed radially inward of the first elastomeric V-ring seal; and
   a check valve plate within the internal cavity, wherein the check valve plate is translatable, in response to pressure differentials, between a closed position against the first seat and an open position against the second seat within the internal cavity of the housing;
   wherein the first elastomeric V-ring seal is positioned to surround an opening defined by the housing for fluid communication between the internal cavity and the first port.

2. The check valve of claim 1, wherein the first elastomeric V-ring seal includes a body having an interference fit to an annular channel defined by the housing and a lip extending from the body in a direction that defines a generally V-shaped void, viewed in cross-section, a opening in a direction away from and generally perpendicular to the flow through the elastomeric V-ring seal into the internal cavity.

3. The check valve of claim 1, wherein the first elastomeric V-ring seal is positioned in the housing to mate with a major surface of the check valve plate proximate an outer periphery of the major surface.

4. The check valve of claim 1, wherein the check valve plate is a continuous plate.

5. The check valve of claim 1, wherein the housing further comprises one or more alignment members extending into the internal cavity positioned to guide the check valve plate as it translates between the closed and open positions.

6. The check valve of claim 5, wherein the housing has a generally central alignment member, the check valve plate has a bore therethrough, and the generally central alignment member is received in the bore of the check valve plate.

7. The check valve of claim 6, wherein the second elastomeric V-ring seal is disposed about and proximate the generally central alignment member with an opening of a generally V-shaped void formed by a body and a lip of the second elastomeric V-ring seal facing toward the generally central alignment member.

8. The check valve of claim 1, wherein the second seat is a plurality of radially spaced apart fingers extending into the internal cavity.

9. The check valve of claim 1, wherein the check valve plate comprises a rigid material.

10. A check valve comprising:
    a housing defining an internal cavity having a first port and a second port both in fluid communication therewith, having a plurality of alignment members positioned within the internal cavity, and having a first seat defined by a first elastomeric V-ring seal and a second seat; and a check valve plate within the internal cavity, wherein the check valve plate is translatable, in response to pressure differentials, between a closed position against the first seat and an open position against the second seat within the internal cavity of the housing;

wherein the first elastomeric V-ring seal is positioned to surround an opening defined by the housing for fluid communication between the internal cavity and the first port;

wherein the check valve plate has a cogged periphery, and each cog is between consecutive alignment members of the plurality of alignment members.

11. The check valve of claim 10, wherein the plurality of alignment members protrude inward from an interior wall of the internal cavity, and the check valve plate has a uniform outer diameter.

\* \* \* \* \*